Dec. 25, 1934.  J. R. STENCE  1,985,354
TIE ROD END CONSTRUCTION
Filed June 20, 1933   3 Sheets-Sheet 1
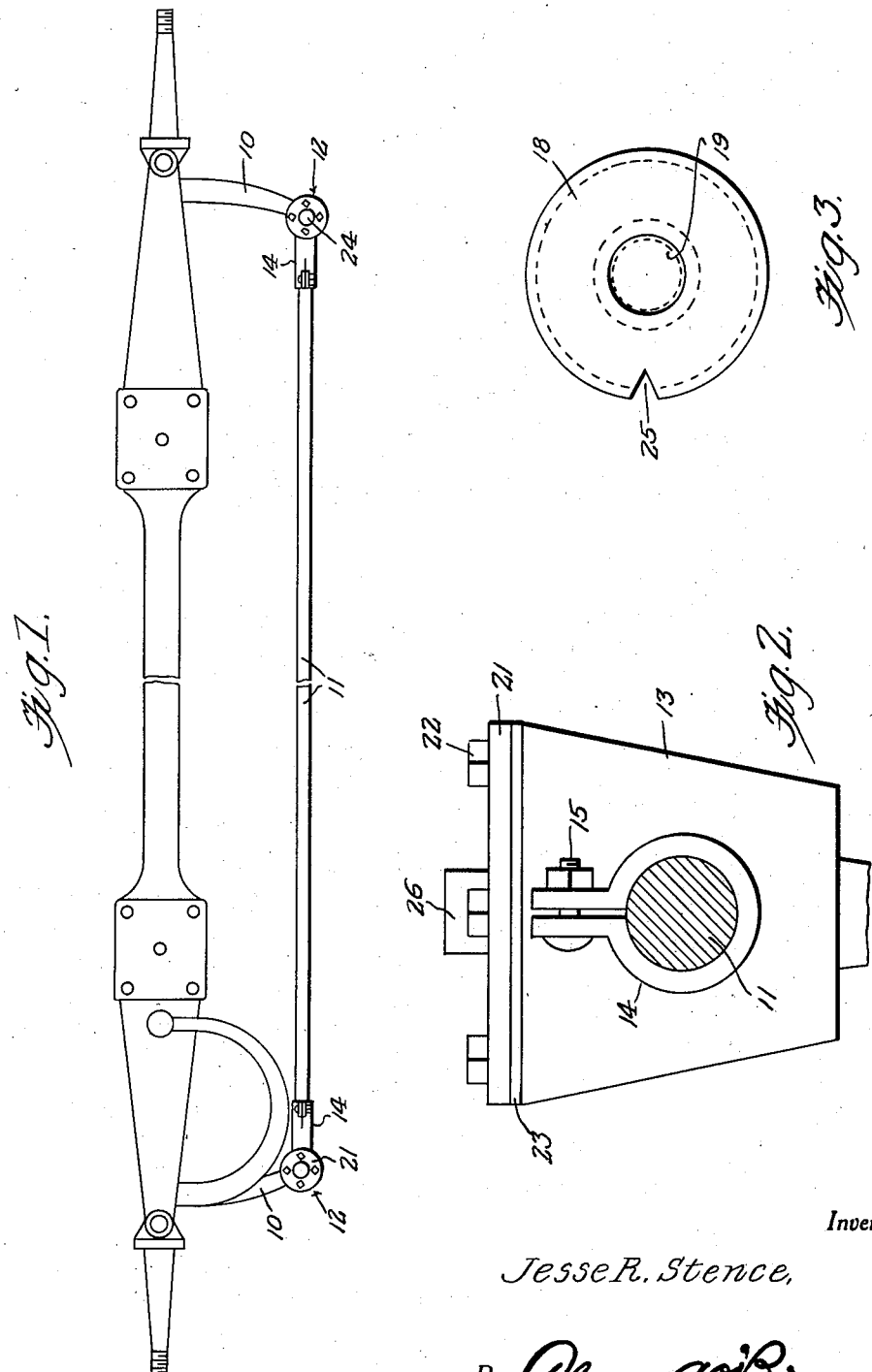
Inventor
Jesse R. Stence,
By Clarence A. O'Brien
Attorney

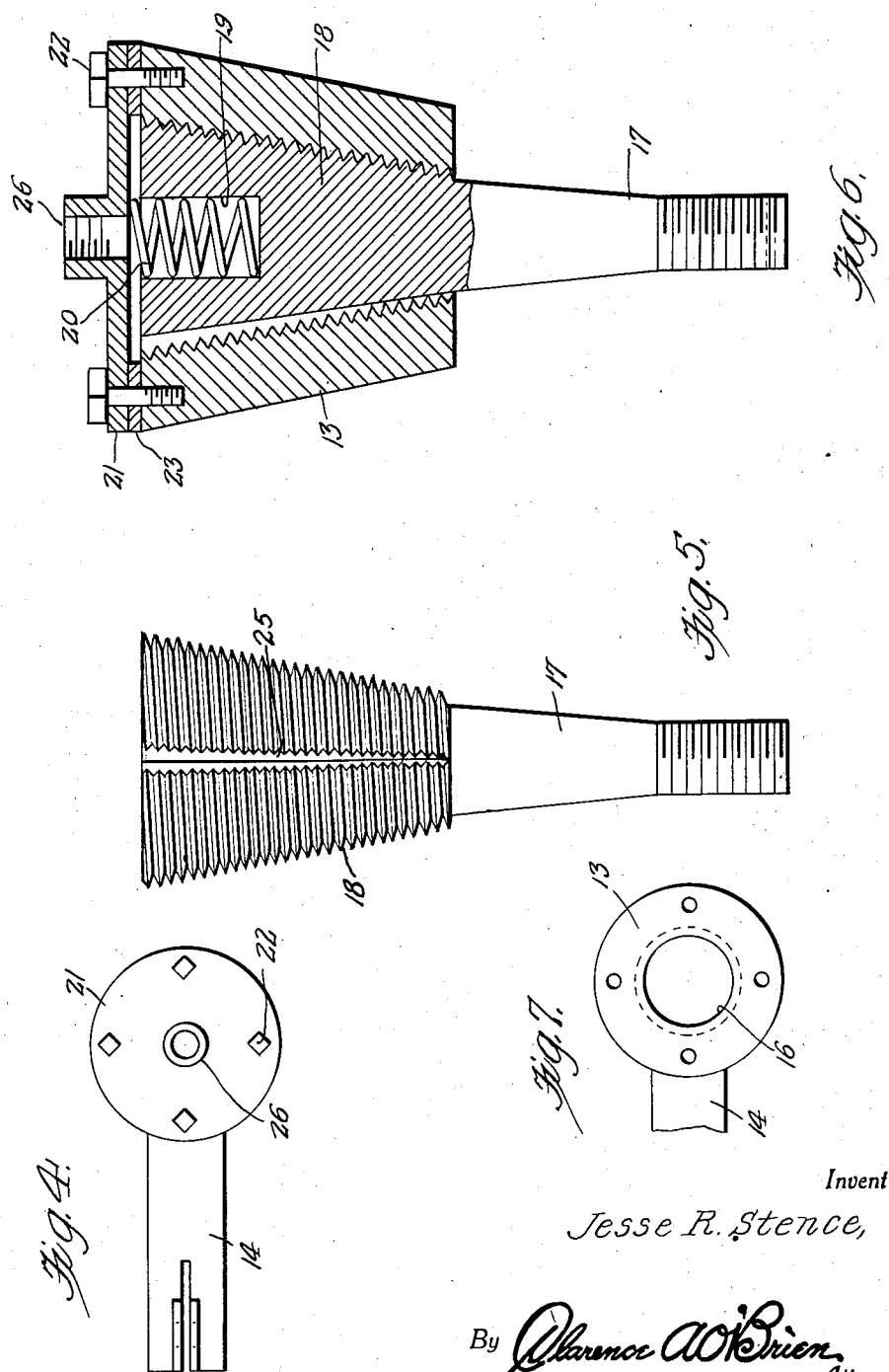

Dec. 25, 1934.   J. R. STENCE   1,985,354
TIE ROD END CONSTRUCTION
Filed June 20, 1933   3 Sheets-Sheet 3
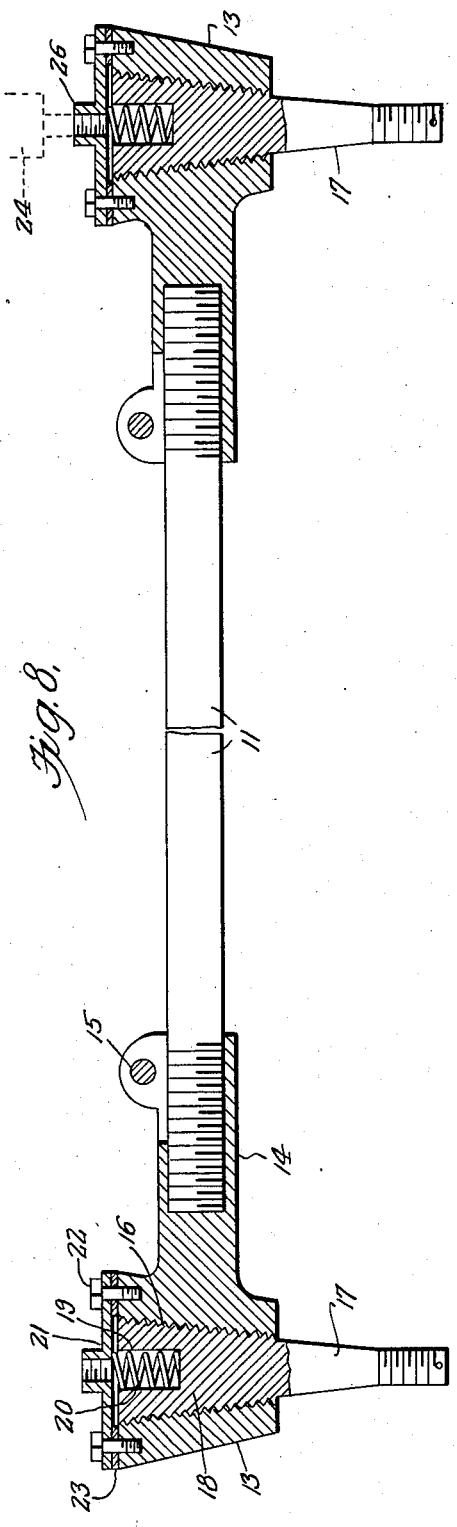
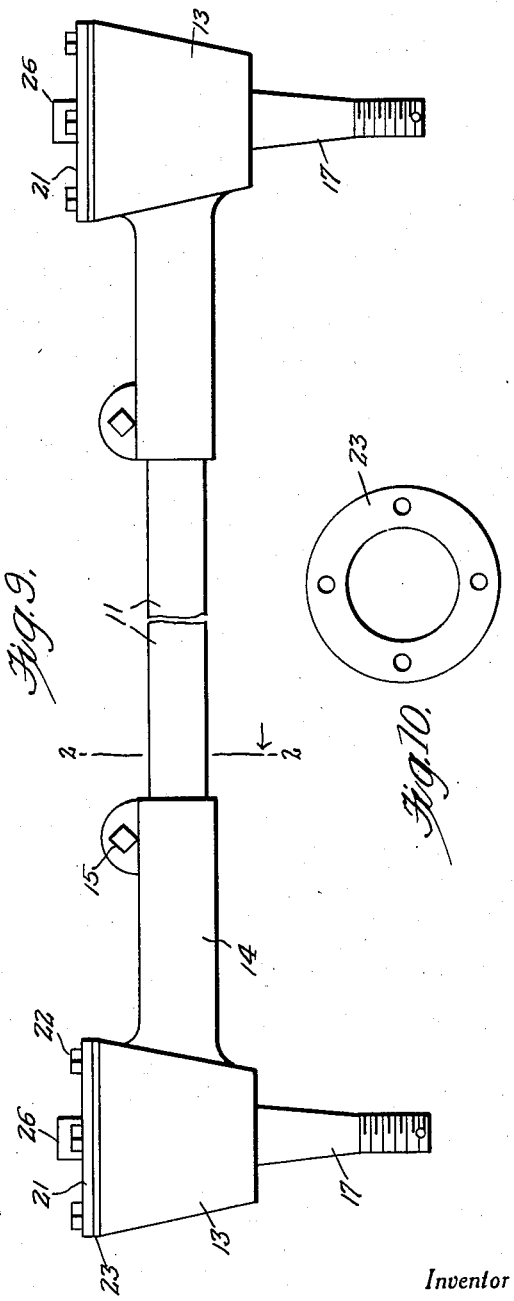
Inventor
Jesse R. Stence,
By Clarence A. O'Brien
Attorney Patented Dec. 25, 1934

1,985,354

UNITED STATES PATENT OFFICE 1,985,354

TIE ROD END CONSTRUCTION

Jesse R. Stence, Greggton, Tex.

Application June 20, 1933, Serial No. 676,707

2 Claims. (Cl. 287—93)

This invention relates to improvements in tie rod end constructions and more particularly to the joint connection between the ends of the tie rod and the respective steering wheel arms with which the rod is associated.

The object of the invention is the provision of a safe, durable joint of simple construction for use as a steering connection in the manner above suggested.

The invention together with its numerous objects and advantages will be best understood from a study of the following description taken in connection with the accompanying drawings wherein:

Figure 1 is a plan view of a steering assembly illustrating the application of the invention.

Figure 2 is a sectional view taken substantially on the line 2—2 of Figure 9.

Figure 3 is a top plan view of a stud embodying the features of the present invention.

Figure 4 is a plan view of the joint or tie rod end, per se.

Figure 5 is an elevational view of a stud.

Figure 6 is a vertical sectional view through the socket and stud forming part of the joint.

Figure 7 is a top plan view of the socket with the cap removed.

Figure 8 is a view of the tie rod assembly with the ends or joints on the ends of the tie rod shown in section.

Figure 9 is an elevational view of the tie rod assembly shown in Figure 8, and

Figure 10 is a plan view of the gasket.

Referring to the drawings by reference numerals it will be seen that 10—10 indicate the steering arms of a motor vehicle while the reference numeral 11 indicates the tie rod. The connections between the rod 11 and the arms 10 are indicated generally by the reference numerals 12. The connections 12 are identical in construction and a detailed description of one will teach the construction of the other.

In accordance with the present invention the connection 12 comprises a socket 13 provided on one end of an arm 14 and as clearly shown in Figure 8, the arm 14 is in the nature of a tubular shank internally threaded to engage corresponding threads on the end of the tie rod 11 to which it is joined. As is conventional the shank 14 adjacent its free end is longitudinally split and is provided with perforated lugs to receive a bolt 15 which clamps the shank tightly upon the rod 11.

In accordance with the present invention the socket 13 which is integral with the arm 14 is substantially frusto-conical in form and has a threaded tapered opening 16 extending therethrough. A stud or pin 17 has an upper tapered and threaded portion 18 for screw threaded engagement within the opening 16 of the socket, the upper portion 18 providing a head for the pin or stud 17. The lower portion of the stud 17 is adapted to engage in a steering arm 10 in the conventional manner and at its terminal is provided with threads for accommodating a securing nut.

In the upper or largest end of the head 18 of the stud is an axial socket 19 that receives a coil spring 20, the upper end of which coil spring seats against the inner side of cap 21 provided for the top of the socket. Cap 21 is in the nature of a flat disk provided adjacent its marginal edge with openings for receiving screws 22 whereby provision is made for securing the cap on the upper end of the socket. Interposed between the upper end of the socket and the cap is an annular gasket 23, the same being provided with suitable openings for accommodating the screws 22.

The cap 21 is provided with a centrally located threaded neck or nipple 23 for accommodating an alemite fitting in a manner suggested in Figure 8, the fitting being shown by dotted lines and indicated by the reference numeral 24. To insure proper lubrication the stud at the head part 18 thereof is provided with a lubricant groove 25 interrupting the threads on the part 18 as will be clear from a study of Figures 5 and 6.

In adjusting the studs 17 in the sockets 13, the front wheels of the vehicle are turned to the extreme right and then the parts are adjusted until the studs have a tight fit with the sockets. Then when the wheels are turned to the extreme left, the studs would only make $\frac{5}{16}$ of a turn and thus the studs would still fit in the sockets tightly enough to prevent rattling. Thus by adjusting the studs in the sockets 13, after the front wheels have been turned to the extreme right, the parts will turn freely both to the right and left without being loose or rattling and when the wheels are in a straight ahead position, the parts would only be moved $\frac{5}{32}$ of one turn from the tight position they occupy when the wheels are turned fully to the right. The spring 20 will hold the threads of the socket 13 and of the stud in engagement, even though the threads have become worn and thus lubricant will be held within the socket and water and dirt will be prevented from entering the socket While I have herein shown and described the preferred embodiment of the invention it is to be understood that it is in no wise intended to restrict the invention to the precise details of construction, combination and arrangement of elements illustrated and described, other than may be necessary to meet the requirements of the prior art and scope of the appended claims.

Having thus described my invention, what I claim as new is:

1. Means for connecting a tie rod to the steering arms of a vehicle comprising a straight part at each end of the rod having a vertically arranged head at its terminal, said head having a vertically arranged downwardly tapering socket therein which passes through both the upper and lower ends of the head and is internally threaded, a stud having a downwardly tapered upper portion fitting in each socket and externally threaded to engage the threads of the socket, a cap closing the upper end of the socket and spaced from the upper end of the stud, a spring engaging parts of the upper part of the stud and of the cap, means for introducing lubricant into the space between the cap and stud, and means for connecting the lower part of the stud with a steering arm.

2. In a connection of the class described, a straight elongated member having an enlarged vertically arranged head at one end thereof provided with a frusto-conical socket having its large end opening out through the upper end of the head and its lower end through the lower end of the head, the walls of the socket being screw-threaded, a stud having a frusto-conical upper part fitting in the socket and exteriorly threaded to engage the threads of the socket, a plate forming a closure member for the upper end of the socket and having a grease fitting opening therein, said plate having its under face spaced from the upper end of the stud, a spring having one end engaging the plate and the other end a part of the stud, and the frusto-conical part of the stud having a vertically arranged groove therein passing through portions of the threads for leading grease from said space to the threads.

JESSE R. STENCE.